UNITED STATES PATENT OFFICE.

WILLIAM B. GERE, OF SYRACUSE, NEW YORK, ASSIGNOR TO MERRELL-SOULE COMPANY, OF SYRACUSE, NEW YORK, A CORPORATION OF NEW YORK.

PROCESS FOR TREATING CREAM, WHOLE MILK, OR SKIMMED MILK.

1,188,755.     Specification of Letters Patent.     Patented June 27, 1916.

No Drawing.     Application filed October 5, 1912. Serial No. 724,210.

*To all whom it may concern:*

Be it known that I, WILLIAM B. GERE, of Syracuse, in the county of Onondaga, in the State of New York, have invented new and useful Improvements in Processes for Treating Cream, Whole Milk, or Skimmed Milk, of which the following, taken in connection with the accompanying drawings, is a full, clear, and exact description.

This invention relates to a process for treating cream, whole milk or skimmed milk for the purpose of producing a practically sterile powder at a temperature 212° F.

Processes have been set forth for producing a practically sterile milk powder at temperature above 212° F. and also processes for producing milk powder at a temperature below 212° F. but no process is known for producing a sterile milk powder at a temperature under 212° F.

The method of drying milk to powder by atomizing or spraying the milk into a current of heated air is the most satisfactory known method of drying milk, but it is practically impossible by this process to produce a sterile milk powder in this way as milk sterilized in commercial quantities becomes contaminated more or less before it passes through the spraying apparatus so that the last part of the lot of sterilized milk will show a considerably greater bacteria count than the first part of the lot.

I have discovered by a series of tests that the spraying of milk into heated air does not destroy the bacteria of the milk to any extent so that if milk contains bacteria before drying, practically the same amount of bacteria will be found alive in the dry powder after the drying is finished.

The intention of my process is to simultaneously sterilize and dry the milk so that the sterilization may be thorough and complete in every portion of the resulting product. To accomplish this I introduce a small jet of live steam preferably at a point just prior to its passage into the spraying device located just inside the desiccating chamber. By introducing this jet of steam into the milk conducting pipe, I am heating a relatively small quantity of milk at a time and the time during which it is subject to the heating is very limited, thereby obviating the objectionable cooked or pasteurized flavor produced by ordinary sterilizing processes, and I am enabled to produce a perfectly soluble milk powder having no foreign flavor so that when the proper amount of water is added a liquid milk is produced of the same flavor and character which the original liquid milk had prior to desiccation, except that the bacteria count is reduced to a minimum.

There are many ways in which the jet of live steam may be introduced into the milk and as I do not limit myself to any special structure for so doing, I have deemed that drawings illustrating any particular method are unnecessary.

In order that the sterilizing result may be accomplished more quickly I prefer to heat the milk to a temperature of from 160° to 185° F. before mingling the jet of live steam with it as in this way less steam is required and the sterilization may be more thoroughly accomplished.

By the expression "practical absence of bacteria" as used in the claims hereof, a bacteria count of less than thirty thousand (30,000) per cubic centimeter of milk powder is meant.

What I claim is:

1. A process of producing a practically sterile milk powder which consists in heating the milk to a point below boiling by introducing a jet of live steam into the milk and immediately spraying the heated milk to reduce it to a powder.

2. A process of producing a practically sterile milk powder which consists in heating the milk in the form of spherical particles under pressure to a point below boiling by introducing live steam into the milk and spraying the milk while at a temperature of from 160° to 211° F. to reduce the milk to a powder.

3. A process of producing a milk powder which consists in sterilizing the milk by the introduction of live steam and immediately spraying the sterile milk to reduce it to a powder.

4. A process of producing practically sterile milk powder which consists in heating the milk to a temperature of from approximately one hundred and sixty (160°) degrees to approximately one hundred and eighty-five (185°) degrees, and immediately spraying the heated milk into moisture-absorbing air to reduce it to a powder.

5. A milk powder soluble in water characterized by the practical absence of bacteria and which, if immediately restored to liquid form by the addition of water, has the same flavor and character as the original milk.

6. A milk powder soluble in water characterized by the practical absence of bacteria and the presence of active enzyms, and which, if immediately restored to liquid form by the addition of water, has the same flavor and character as the original milk.

7. A milk powder soluble in water, consisting solely of the constituents of milk and characterized by the practical absence of bacteria and the presence of active enzyms.

In witness whereof I have hereunto set my hand this third day of October, 1912.

WILLIAM B. GERE.

Witness:
C. A. THOMPSON.